United States Patent [19]

Zook

[11] Patent Number: 5,111,463
[45] Date of Patent: May 5, 1992

[54] ERROR CORRECTION METHOD AND APPARATUS

[75] Inventor: Christopher P. Zook, Lafayette, Colo.

[73] Assignee: Exabyte Corporation, Boulder, Colo.

[21] Appl. No.: 475,187

[22] Filed: Feb. 5, 1990

Related U.S. Application Data

[63] Continuation-in-part of Ser. No. 434,009, Dec. 9, 1989, abandoned.

[51] Int. Cl.$^5$ .............................................. G06F 11/10
[52] U.S. Cl. .................................... 371/39.1; 371/2.2; 371/40.1; 360/48; 360/53
[58] Field of Search ..................... 371/39.1, 38.1, 2.2, 371/2.1, 40.1; 360/53, 48, 38.1

[56] References Cited

U.S. PATENT DOCUMENTS

| | | | |
|---|---|---|---|
| 4,201,976 | 5/1980 | Patel | 371/50 |
| 4,205,324 | 5/1980 | Patel | 371/50 |
| 4,742,517 | 5/1988 | Takagi | 371/2.2 |
| 4,744,086 | 5/1988 | Komly | 371/39.1 |
| 4,835,627 | 5/1989 | Endo | 371/2.1 x |
| 4,845,713 | 7/1989 | Zook | 371/37 |
| 4,845,714 | 7/1989 | Zook | 371/50 |
| 4,852,102 | 7/1989 | Yamaguchi | 371/39.1 X |
| 4,882,732 | 10/1989 | Kaminaga | 371/2.2 |
| 4,908,826 | 3/1990 | Hertrich | 360/53 X |

OTHER PUBLICATIONS

D. M. Oldham, "Error Detection and Correction", IBM Technical Disclosure Bulletin, vol. 13, No. 12, May 1971, 3715.

A. M. Patel, "Coding Scheme for Multiple Sections Error Correction", IBM Technical Disclosure Bulletin, vol. 17, No. 2, Jul. 1974, 473-475.

Arvind M. Patel, "Adaptive Cross-Parity (AXP) Code for a High-Density Magnetic Tape Subsystem", IBM Journal of Research and Development, Nov. 1985, vol. 29, No. 6, 546-562.

P. Prusinkiewicz and S. Budkowski, "A Double Track Error Correction Code for Magnetic Tape", IEEE Transactions on Computers, Jun. 1976, vol. c-25/No. 6, 643-645.

Primary Examiner—Robert W. Beausoliel
Attorney, Agent, or Firm—Griffin Branigan & Butler

[57] ABSTRACT

In a method of encoding and decoding informational data for transmission to a storage medium, a group G of physical blocks written to the storage medium includes both user data information blocks and auxiliary error correction blocks. Each block ($B_{r,c}$) included in the group G belongs both to a row r and a column c. Informational data is formatted into preselected bit positions of the user data information blocks. Values for bit positions in the auxiliary error correction blocks are generated by performing an exclusive OR operation upon values in corresponding bit positions in a subgroup of strategically selected user data blocks. By strategically selecting the user data blocks to be included in the subgroup, the method facilitates recovery of entire blocks, and even rows or columns of blocks.

50 Claims, 10 Drawing Sheets

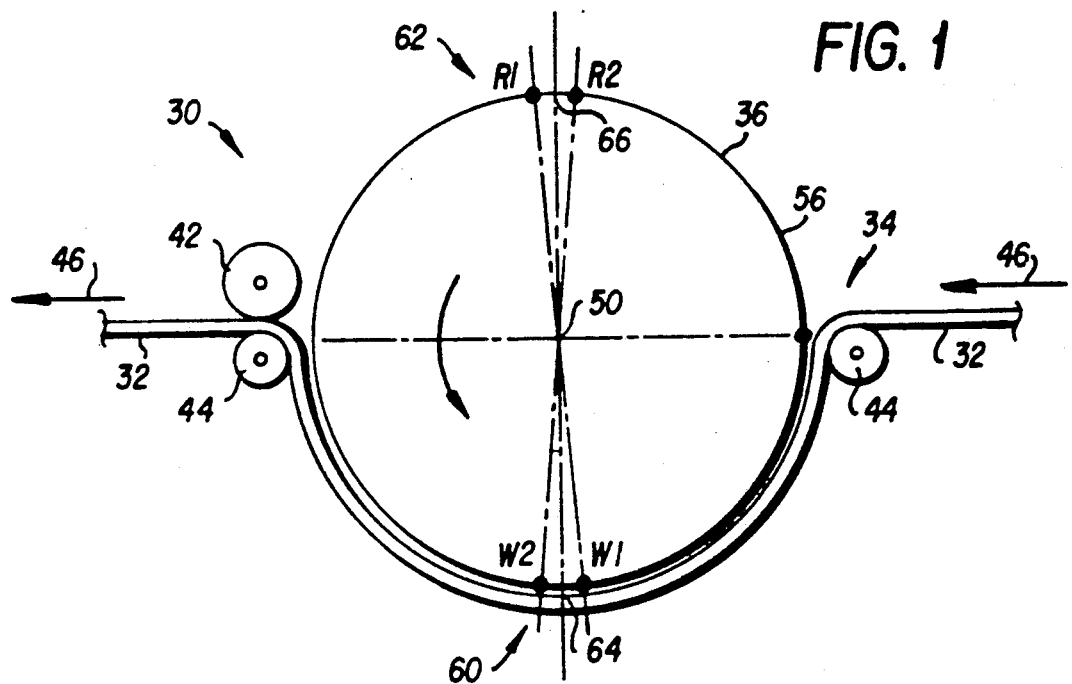
FIG. 1
FIG. 2
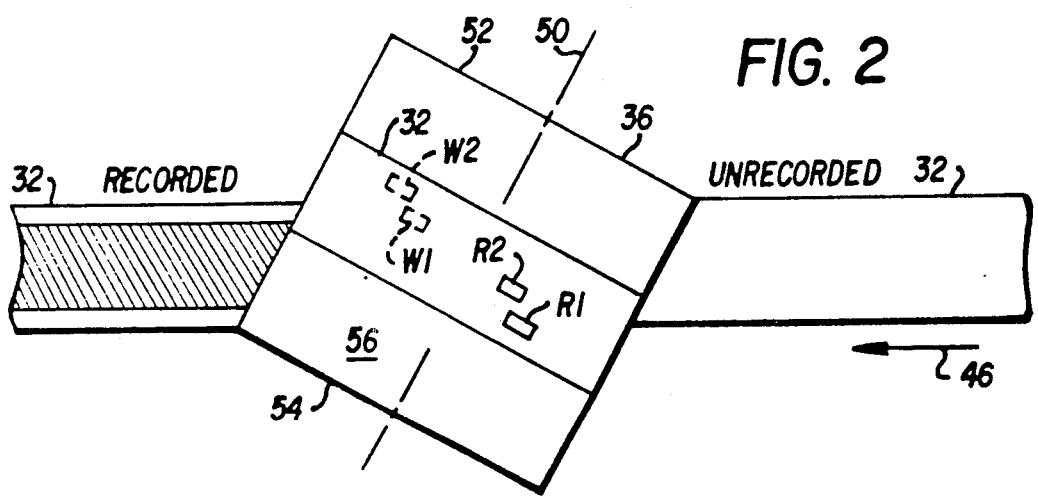
FIG. 8

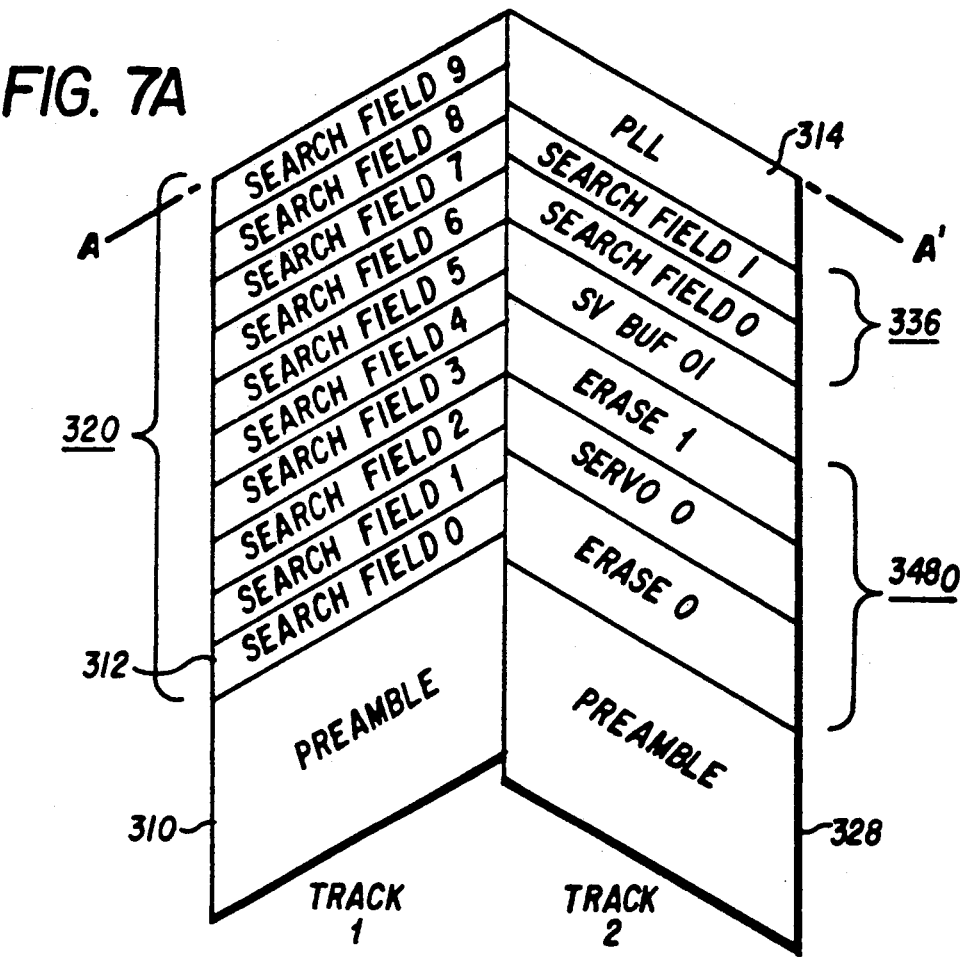

FIG. 9

| BIT BYTE | 7 | 6 | 5 | 4 | 3 | 2 | 1 | 0 |
|---|---|---|---|---|---|---|---|---|
| 0 | AUXECC | INIECC | WRTRTY | BLK HI | BLOCK TYPE (OH) | | | |
| 1 | (MSB) | | | | | | | |
| 2 | BLOCK ID | | | | | | | |
| 3 | | | | | | | | (LSB) |
| 4 | LOGICAL BLOCK NUMBER | | | | START 1 | END 1 | 1st LBLK | (HI) |
| 5 | FIRST LOGICAL BLOCK LENGTH (LSB) | | | | | | | |
| 6 | LOGICAL BLOCK NUMBER | | | | | | | |
| 7 | PSYSHI | RESERVED | | LAST 2 | START2 | END 2 | 2nd LBLK | (MSB) |
| 8 | SECOND LOGICAL BLOCK LENGTH (LSB) | | | | | | | |
| 9 | (MSB) | | | | | | | |
| A | CRC (LSB) | | | | | | | |
| B | (MSB) | | | | | | | |
| C | PHYSICAL BLOCK ID | | | | | | | |
| D | | | | | | | | (LSB) |

FIG. 10

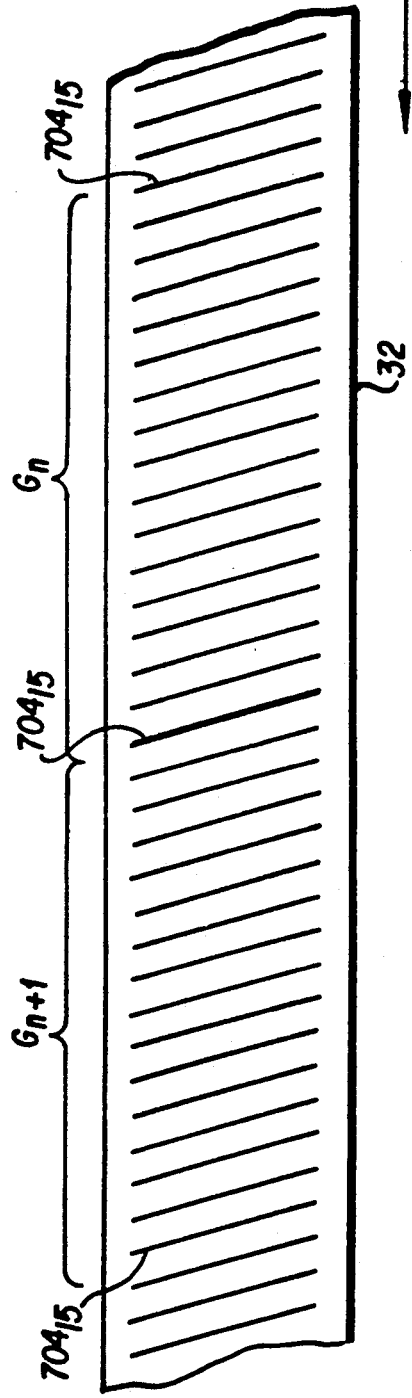

1

ERROR CORRECTION METHOD AND APPARATUS

BACKGROUND

This application is a continuation-in-part application of U.S. patent application Ser. No. 07/434,009, filed Dec. 9, 1989 now abandoned.

1. FIELD OF INVENTION

This invention pertains to method and apparatus for error correction of stored or transmitted data, and particularly for correcting errors occasioned by the loss of entire blocks or a plurality of blocks of information recorded on storage medium.

2. PRIOR ART AND OTHER CONSIDERATIONS

For decades digital information has been recorded on magnetic media, including magnetic tape and magnetic disks. Unfortunately, noise occurring in the storing of data on the media, or in the reading of data from the media, can result in errors. To alleviate this problem, various encoding techniques have been developed to specially encode the transmitted or stored data in order to afford error correction capability.

Typically the digital information is stored in the form of physical blocks of data, with each block consisting of a plurality of bits. In accordance with prior art error encoding techniques, within each block sets of information or message bits have check bits appended thereto to form a codeword. The check bits for the codeword are derived by an encoder which operates on the set of information bits using a predetermined code, such as a Reed-Solomon code. The encoder imparts desired properties to the codewords so that, upon subsequent reading of the blocks, the codewords can be decoded in such a manner that errors are discernable and correctable. An example of a decoder is provided in U.S. Pat. No. 4,845,713 to Christoper P. Zook, entitled METHOD AND APPARATUS FOR DETERMINING THE COEFFICIENTS OF A LOCATOR POLYNOMIAL, which is incorporated herein by reference.

Operating upon a block, two or more codes can be combined to produce a more powerful code and to offer an essentially second level of error correction for the block. Such a combinatation of codes is known in the literature as "two dimensional codes" or "product codes". An example of an error correction system operating with product codes is provided in U.S. Pat. No. 4,845,714 of Christopher P. Zook, entitled MULTIPLE PASS ERROR CORRECTION PROCESS AND APPARATUS FOR PRODUCT CODES, which is incorporated herein by reference.

Current error correction schemes are generally sufficient for correcting errors that occur within a block of recorded information. Yet there are occasions when entire blocks are unreadable. Even worse, at times a plurality of blocks may be unreadable. Error correction at the block level, with error correction bits embedded in the block, is of no avail when one or more entire blocks are lost.

One example of the problem of block loss occurs in the environment of helical scan recording. In a helical scan arrangement, travelling magnetic tape is partially wrapped around a rotating drum so that heads positioned on the drum are contiguous to the drum as the drum is rotated. A write head on the drum physically records data on the tape in a series of discrete stripes oriented at an angle with respect to the direction of tape travel. The data is generally formatted into a plurality of physical blocks per stripe. Examples of helical scan recording systems are provided in U.S. Pat. No. 4,843,495, U.S. Pat. No. 4,835,638, and U.S. Pat. No. 4,845,577.

In helical scan technology, there are two motions with respect to the tape. A first motion is the movement of the heads which follow a diagonal stripe across the tape to write and/or read blocks in the stripe. A second motion is the linear motion of the tape from reel-to-reel and over tape guides.

Accordingly, in helical scan technology there are also two types of error that can occur as a result of these two motions. The first type of error destroys multiple blocks in a stripe. A second type of error destroys blocks in the same position in consecutive stripes (i.e., blocks aligned in the direction of tape travel). Current error correction coding techniques do not address the destruction of a plurality of blocks.

Accordingly, it is an object of the present invention to provide method and apparatus for correcting errors involved in the recordation or reading of information on storage media.

An advantage of the present invention is the provision of method and apparatus which facilitates the correction of errors involving the loss of an entire block of data stored on or read from storage media.

A further advantage of the present invention is the provision of method and apparatus which facilitates the recreation of an entire stripe or row of blocks of data lost during storing or reading from storage media.

SUMMARY

In a method of encoding and decoding informational data for transmission to a storage medium, a group G of physical blocks written to the storage medium includes both user data information blocks and auxiliary error correction blocks. Each block ($B_{r,c}$) included in the group G belongs both to a row r and a column c. Informational data is formatted into preselected bit positions of the user data information blocks. Values for bit positions in the auxiliary error correction blocks are generated by performing an exclusive OR operation upon values in corresponding bit positions in a subgroup of strategically selected user data blocks. By strategically selecting the user data blocks to be included in the subgroup, the method facilitates recovery of entire blocks, and even rows or columns of blocks.

In a preferred mode of the invention, the columns of each group G are each written as helical stripe on magnetic tape by a helical scan recording system, with the informational data blocks recorded in stripes that precede stripes containing the auxiliary error correction blocks. Each stripe comprises k number of blocks; each group G comprises n number of stripes.

Also according to a preferred mode of the invention, m number of error correction blocks $E_i$ are generated for inclusion in the group of blocks $B_{r,c}$. In this regard, i ranges from 0 to m-1, and $m = q \times k$ with q being an integer constant. The value of each bit position included in each auxilary error correction block $E_i$ is derived from the sum of the bits having the corresponding bit position in all blocks $B_{r,c}$ where $i = (r + k(c \bmod q) + INT(c/q)) \bmod m$. Each auxilary error correction block has stored therein a bit indicating that the block is an auxiliary error correction block. Blocks recorded in a stripe following a stripe of auxiliary correction blocks have stored therein a bit indicating that the block is not an auxiliary correction block.

Using conventional error correction techniques, error correction bits are inserted both into the user data blocks and into the auxilary error correction blocks in other bit positions.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale. emphasis instead being placed upon illustrating the principles of the invention.

FIG. 1 is a schematic view of head placement on a drum of a helical scan system of an embodiment of the invention.

FIG. 2 is a schematic view of the helical scan system of the embodiment of FIG. 1 recording stripes on magnetic tape.

FIG. 7A-7C are schematic views depicting the format of Track 1 and Track 2 of a magnetic tape recorded by or readable by the helical scan system of the embodiment of FIG. 1.

FIG. 8 is a schematic view depicting the format of a physical data block included on a stripe of magnetic tape recorded by or readable by the helical scan system of the embodiment of, FIG. 1.

FIG. 9 is a schematic view depicting the format of a physical block header of a physical data block included on a stripe of magnetic tape recorded by or readable by the helical scan system of the embodiment of FIG. 1.

FIG. 10 is a schematic view depicting a group of stripes, including an AUXECC stripe, recorded on magnetic tape by by the helical scan system of the embodiment of FIG. 1.

FIG. 11 is a schematic view depicting a plurality of groups of stripes, including an AUXECC stripe, recorded on magnetic tape by by the helical scan system of the embodiment of FIG. 1.

FIG. 12 is a schematic view depicting an alternate manner of generating AUXECC blocks.

DETAILED DESCRIPTION OF THE DRAWINGS

Figure 3:
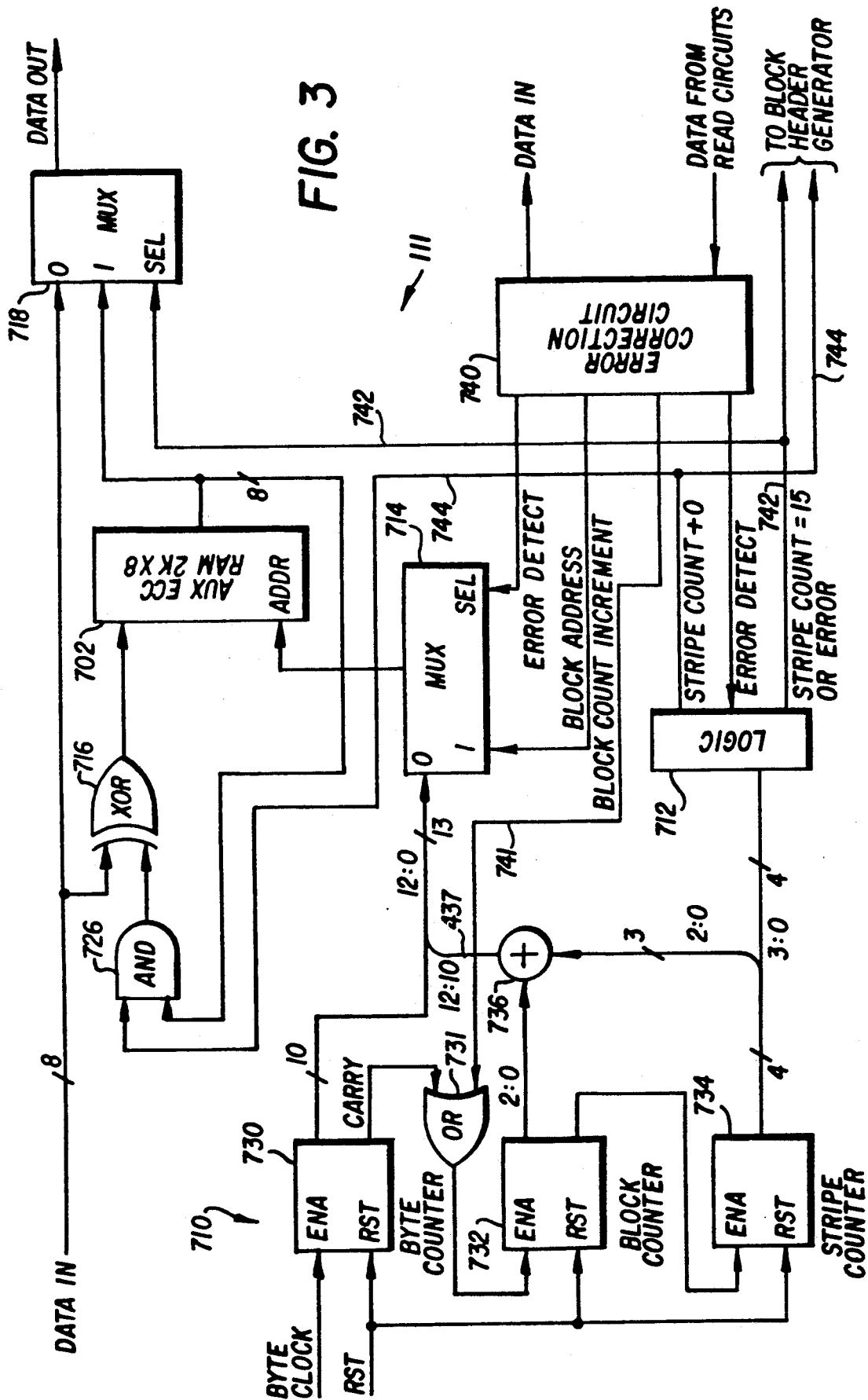
FIG. 3 is a schematic view an AUXECC generator included in the helical scan system of the embodiment of FIG. 1.

FIG. 1 shows drum and transport portions of a helical scan system 30 for recording digital information on magnetic tape 32. The helical scan system 30 includes a tape transport 34 and a rotating drum 36.

The tape transport 34 includes a capstan 42 and two tape guides 44. In conventional manner, the capstan 42 is rotated by an unillustrated capstan drive motor in order to move the tape 32 in a direction of tape travel indicated by arrows 46. In the illustrated embodiment, the capstan 42 rotates to transport the tape 32 at a speed on the order of about one-half inch per second.

DRUM AND HEAD STRUCTURE

The drum 36 is rotatable about drum axis 50. The drum is rotated at a velocity of about 1800 rpm by an unillustrated drum motor. An unillustrated tachometer detects rotations of the drum motor shaft, and hence of the drum, and produces a DRUM SYNC signal. As shown in FIG. 2, drum axis 50, and hence drum 36, is angularly oriented with respect to the edges and direction of travel of the tape 32. The drum 36 has a drum upper surface 52 and a drum lower surface 54, both of which are planar. The drum axis 50 is orthogonal to both the drum upper surface 52 and the drum lower surface 54. The drum 36 also has a peripheral surface 56 which wraps around the circumference of the drum 36.

The peripheral surface 56 of the drum 36 has two sets of heads mounted thereon, in particular a first set of heads comprising write heads W1 and W2 and a second set of heads comprising read heads R1 and R2. In addition, the peripheral surface 56 of the drum 36 has a servo head S mounted thereon.

Figure 6:
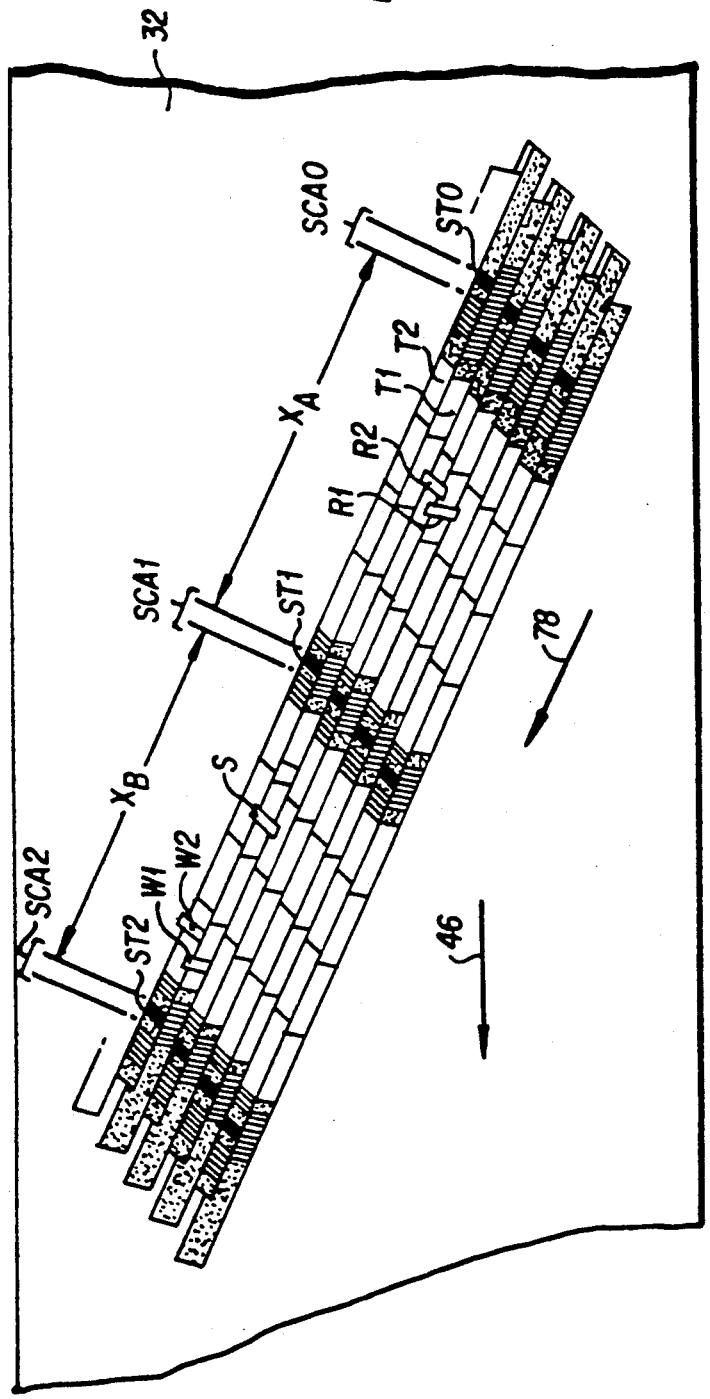
FIG. 6 is a schematic view of a plurality of stripes recorded on magnetic tape by the helical scan system of the embodiment of FIG. 1, and further showing paths of travel of heads provided on the drum of the helical scan system of the embodiment of FIG. 1.

The heads W1, W2, R1, and R2 are mounted to generate helical stripes on the magnetic tape 32 in the manner shown in FIG. 6. Heads W1 and W2 essentially simultaneously write first and second tracks of data, i.e., tracks T1 and T2, respectively, on the tape 32. Heads R1 and R2 are positioned to read tracks T1 and T2, respectively, 180 degrees after the tracks T1 and T2 are written. In this respect, although FIG. 6 shows write heads W1, W2 and read heads R1, R2 traveling over tracks T1 and T2 for the sake of depicting head placement relative to the tracks, it should be understood the read heads R1, R2 and the write heads W1, W2 cannot simultaneously be over the tracks in the manner depicted in FIG. 6. Likewise, the inclusion of the servo head S in FIG. 6 is merely to show the position of the servo head S relative to the tracks T1 and T2, and not in relationship to the read heads R1, R2 or the write heads R1, R2.

In the above regard, four geometrical factors regarding the heads are strategic to enable the simultaneous writing by heads W1 and W2 and the subsequent respective reading by corresponding heads R1 and R2; the angular separation of the heads about the drum peripheral surface 56; the axial location of the heads relative to one another; the width of the heads; and, the azimuthal orientation of the heads. These geometrical factors are explained further in U.S. patent application Ser. No. 07/433,961, entitled DUAL CHANNEL HELICAL SCAN RECORDER, which is incorporated herein by reference.

FIG. 6 shows a plurality of helical stripes recorded on magnetic tape 32 by the helical scan system 30, and the ultimate paths of travel of the heads W1, W2, R1, and R2, as well as the servo head S over the helical stripes. The direction of movement of the heads is depicted by arrow 78 in FIG. 6.

Thus it is seen that a dual channel helical scan system 20 is provided, with a first channel including the heads W1 and R1, and a second channel including the heads W2 and R2. The employment of two channels effectively doubles the data transfer rate, since twice as many tracks are written to tape per revolution of the drum 36. For checking purposes, the heads R1 and R2 read back the two simultaneously written tracks approximately 180 degrees after the tracks are written. The write and read functions occur exclusively, thereby eliminating any crosstalk problems.

SYSTEM STRUCTURE

Figure 4:
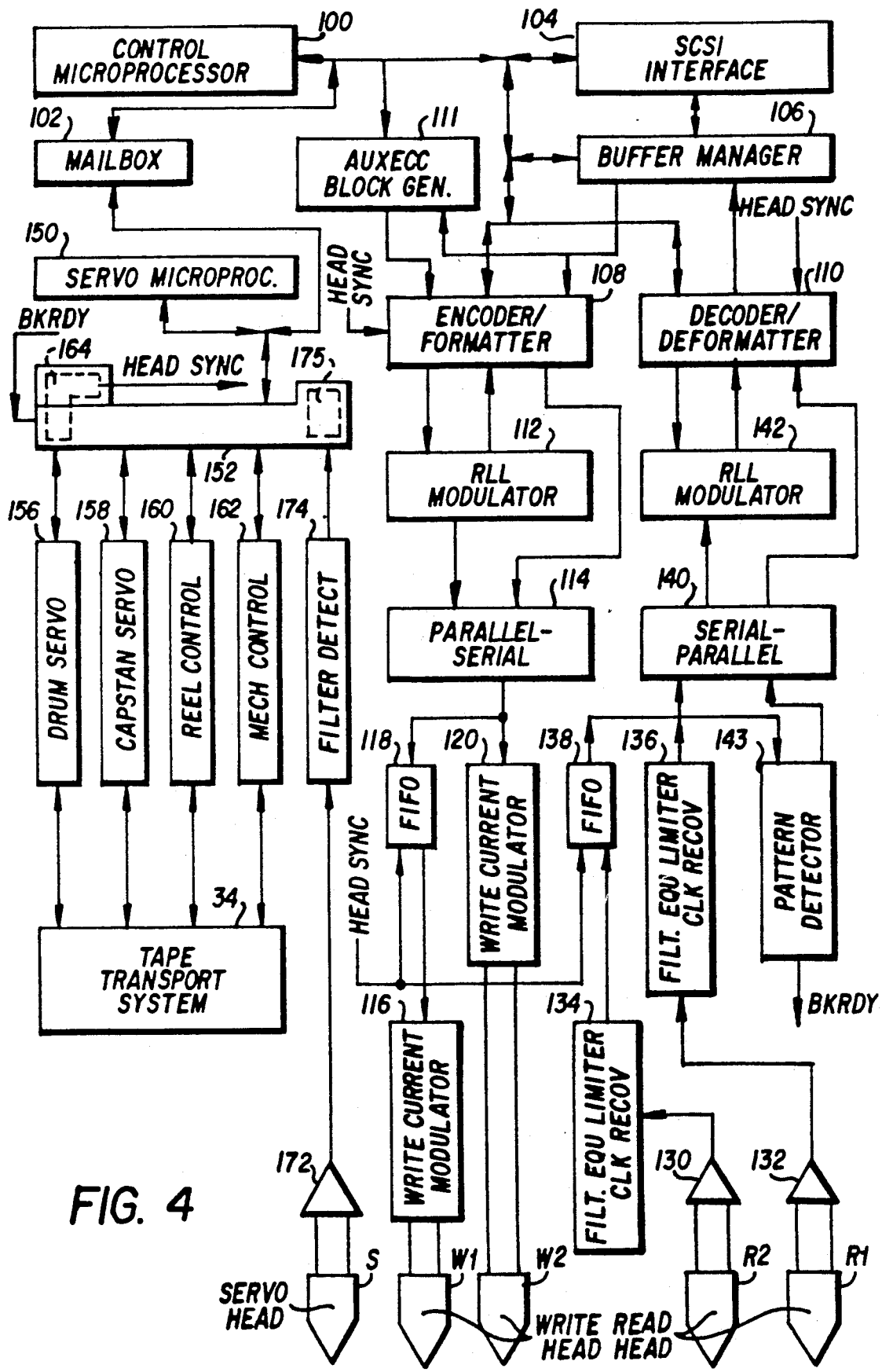
FIG. 4 is a schematic view of the helical scan system facilitating the head placement on a drum according to the embodiment of FIG. 1.

FIG. 4 illustrates the overall helical scan system 30, including the read heads R1, R2, the write heads W1,W2, and the servo head S. The helical scan system 30 further includes a control microprocessor 100 which communicates primarily with a mailbox 102; a SCSI interface 104; a data buffer manager 106; an encoder/-formatter 108; a decoder/de-formatter 110; and, an AUXECC block generator 111.

The data buffer 106 manager comprises a data buffer which includes 1 MByte of DRAM is organized as a 9-bit wide, dual-port, circular memory. Data transfers between the data buffer manager 106 and the SCSI interface 104, the encoder/formatter 108, the decoder/-deformatter 110, and the AUXECC block generator 111 occur asynchronously or synchronously. Logical user data blocks are formatted into physical blocks in the data buffer 106 for recording onto tape.

The AUXECC block generator 111 produces auxiliary error correction blocks for recording error correction stripes on the tape 32. The structure and operation of the AUXECC block generator is further described herein.

The encoder/formatter 108 receives data blocks from the data buffer manager 106 and from the AUXECC block generator 111. The encoder/formatter 108 performs a variety of functions, including appending error correction code (ECC) information, inserting synchronization markers, inserting search fields, and inserting servo fields and perform interleave sequencing of bytes. The encoder/formatter 108 transmits the data blocks and appended information to a RLL Modulator 112 which performs the run-length encoding of the data stream by translating each 8 bit byte to a 10-bit word. The 10-bit word is often transmitted to a bit serializer 114. The bit serializer 114 is connected to a write driver circuit 116 (for write head W1) through a FIFO register 118, and to a write driver circuit 120 (for write head W2). The function of the FIFO register 118 will be explained below in connection with the description of the write operation of the helical scan system 30.

The read heads R2 and R1 are connected to preamplifiers 130 and 132, respectively, for amplifying a read signal. The preamplifiers 130 and 132 are connected to signal conditioning circuits 134 and 136, respectively. The signal conditioning circuits 134 and 136 include circuits for amplitude sensing, equalization, and data clocking and detection.

The signal conditioning circuit 134 is connected to FIFO register 138, which in turn is connected to a serial-to-parallel converter 140. The signal conditioning circuit 136 is connected directly to the serial-to-parallel converter 140.

The serial-to-parallel converter 140 is connected to an RLL De-Modulator 142 and to a pattern detector circuit 143. The RLL Read Modulator basically performs the inverse operations of the corresponding RLL Write Modulator 112.

The pattern detector 143 monitors the incoming stream of data in order to recognize a synchronization field. When the pattern detector 143 has recognized a predetermined number of synchronization fields having a predetermined spacing, the pattern detector 143 generates a BKRDY signal. In addition, the pattern detector 143 supplies to the serial-parallel converter 140 synchronizing signals necessary for the operation of the converter 140.

The RLL De-Modulator 142 is connected to the decoder/de-formatter 110. The decoder/de-formatter 110 assembles data blocks and performs error correction.

The microprocessor 100 communicates through its mailbox 102 with a servo microprocessor 150 and a motion control system 152. The motion control system 152 includes a dedicated microprocessor for communicating with a drum servo 156; a capstan servo 158; reel control circuits 160; and a mechanical controller 162. In addition, upon receipt of the BKRDY signal generated by the pattern detector 143, the motion control system 152 includes circuitry, herein called HEAD SYNC generator 164, for developing a HEAD SYNC signal. The HEAD SYNC generator 164 is described in U.S. patent application Ser. No. 07/434,008 entitled METHOD AND APPARATUS FOR SYNCHRONIZING TIMING SIGNALS, which is incorporated herein by reference. The HEAD SYNC signal is high when the read heads R1 and R2 are over the helical stripes of Track 1 and Track 2. The HEAD SYNC signal is low when the write heads W1 and W2 are over the stripes of Track 1 and Track 2.

The motion control system 152 also communicates with sensor interface circuits for the various unillustrated elements including the following: a drum tachometer; a capstan tachometer; a reel tachometer; an end of tape (EOT) detector; and, a beginning of tape (BOT) detector. As shown in FIG. 4, the tape transport system 34 is connected to the drum servo 156, the capstan servo 158, the reel control 160, and the mechanical controller 162.

The servo head S has its output signal connected to preamplifier 172. The output of the servo preamplifier 172 is applied to a filter and detection circuit 174 which filters the amplified signal and for detecting the servo signals recorded on tape. The filter and detection circuit 174 is in turn connected to a servo tracking circuit 175 included in the motion control system 152. The details of servo tracking circuit 175 are shown in U.S. patent application Ser. No. 07/433,977 entitled SERVO TRACKING FOR HELICAL SCAN RECORDER, which is incorporated herein by reference.

TAPE FORMAT

Figure 5:
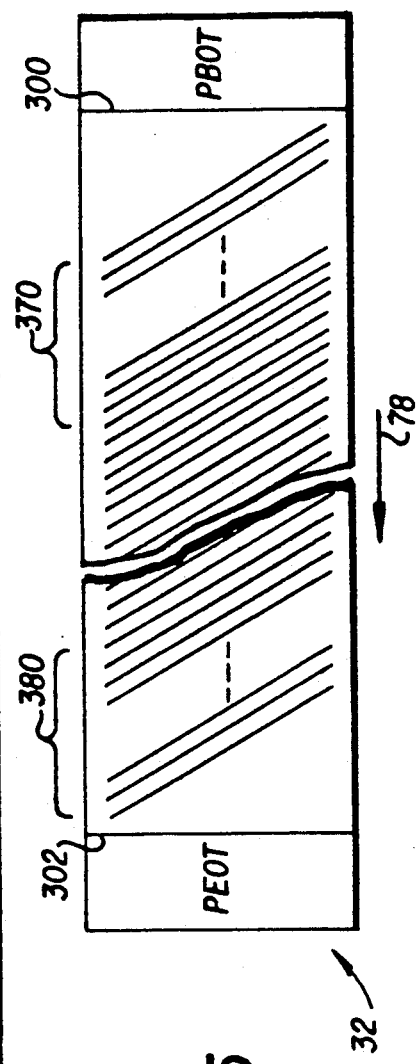
FIG. 5 is a schematic view depicting the format of a magnetic tape recorded by or readable by the helical scan system of the embodiment of FIG. 1.
Figure 7B:
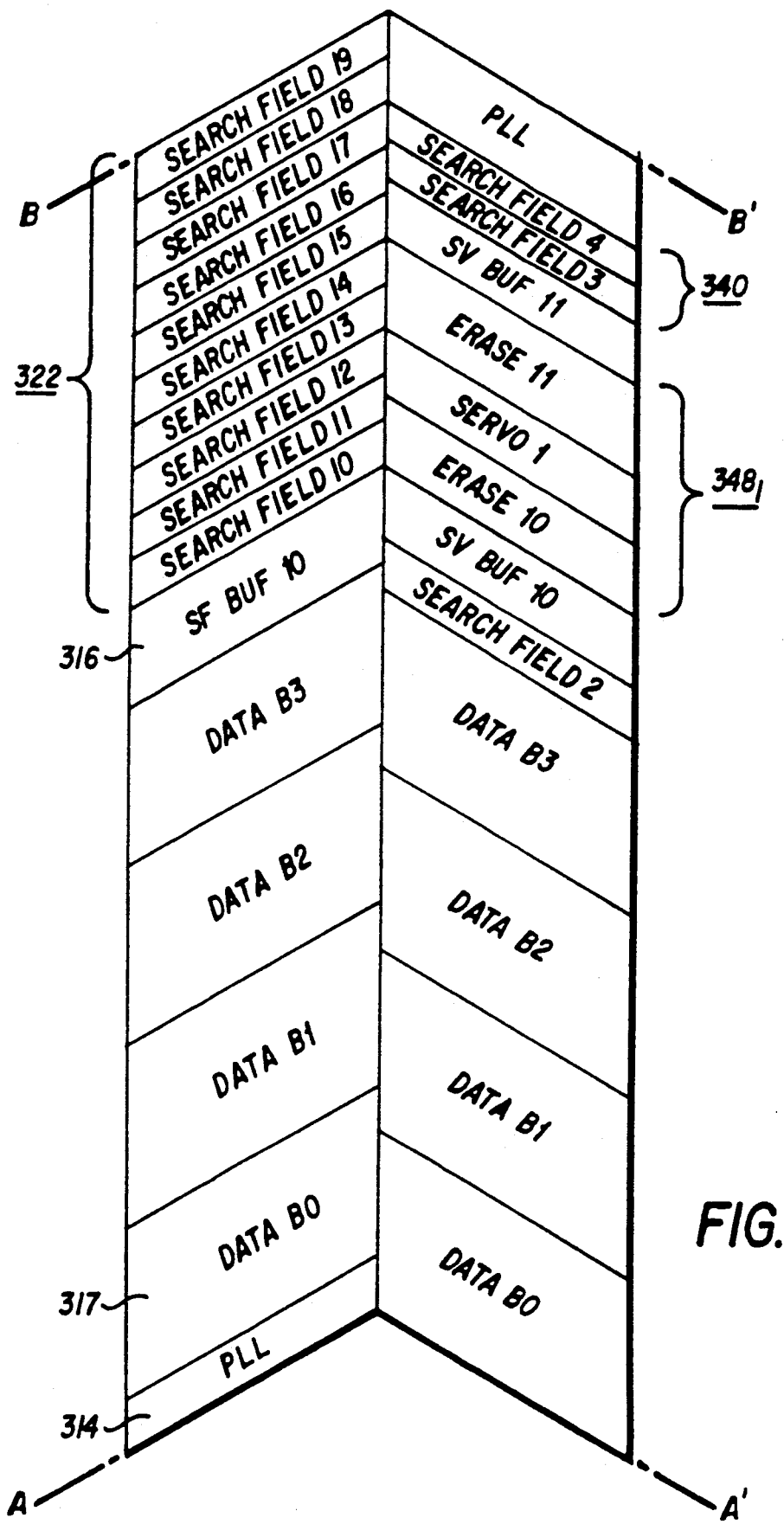
Figure 7C:
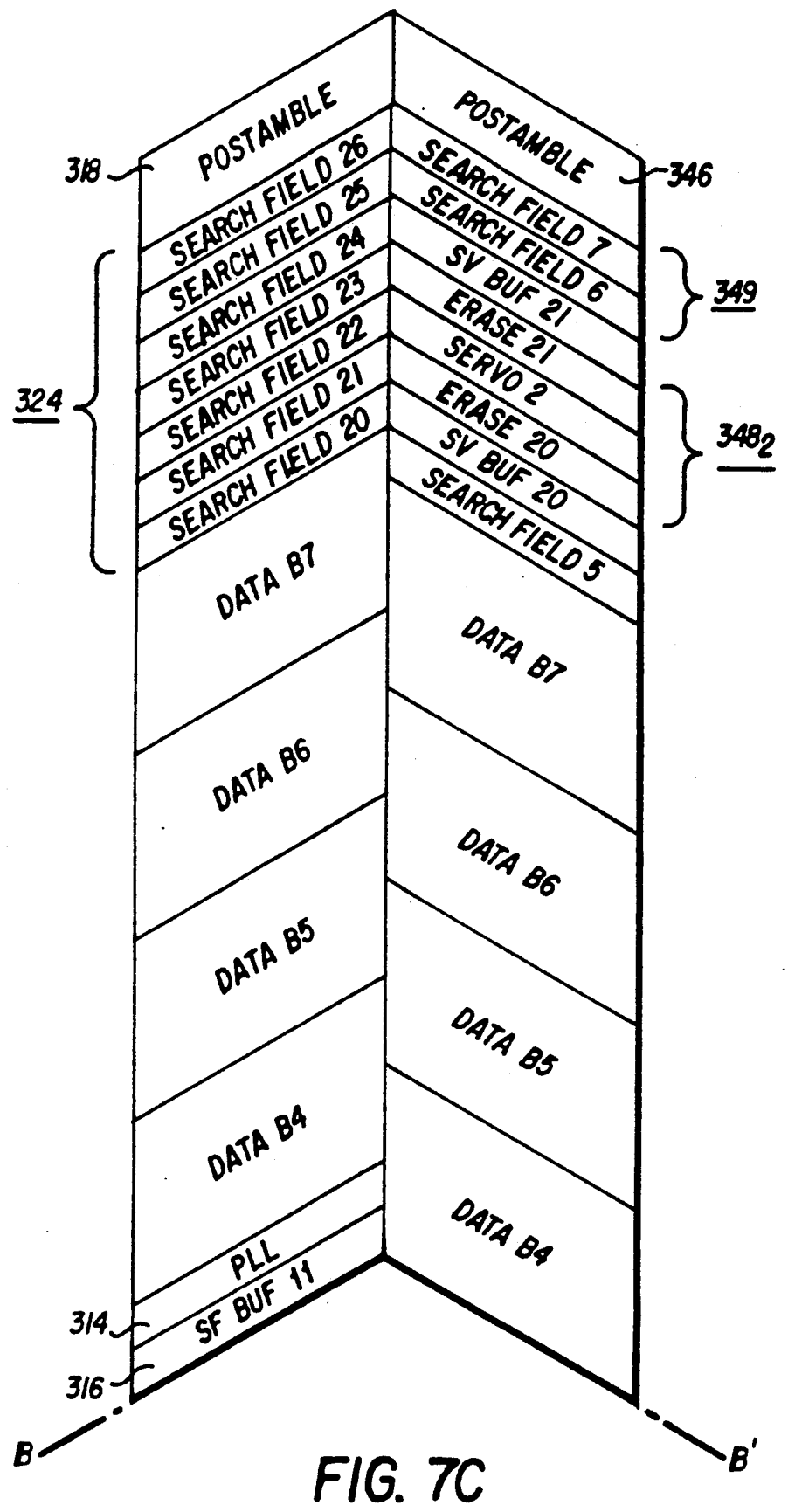

FIG. 5 depicts the format of magnetic tape 32 for the helical scan system 30. The tape 32 has a physical beginning of tape (PBOT) 300 located at the point where a translucent leader material is attached to the magnetic media. Downstream from the PBOT 300 (in the sense of direction of tape transport as shown by arrow 78) are a multitude of helical stripes formed on the magnetic tape media. The helical stripes contain, of course, the information written by the write heads W1 and W2 and read by the read heads R1 and R2. The format of the helical stripes is discussed subsequently in connection with FIGS. 6 and 7. At the end of the tape 32 is a physical end of tape (PEOT) 302.

Since the helical scan system 30 is a dual azimuthal system, in a write mode odd numbered helical stripes are written at a first azimuthal angle A1 by write head W1 and even numbered helical stripes are written at a second azimuthal angle A2. In a read or readback mode, odd numbered helical stripes are read at a first azimuthal angle A1 by write head W1 and even numbered helical stripes are read at a second azimuthal angle A2. As can be discerned from the foregoing, the first azimuthal angle A1 is +20 degrees; the second azimuthal angle A2 is −10 degrees. As used hereinafter, any helical stripe written by write head W1 or read by read head R1 is referred to as "Track 1". Likewise, any helical stripe written by write head W2 or read by read head R2 is referred to as "Track 2".

For the purposes of the present invention, it is sufficient to know that both Track 1 and Track 2 include a plurality of data blocks 317, also known as physical data blocks. In the illustrated embodiment, both Track 1 and Track 2 contain eight (8) such data blocks 317. Other aspects of the format of Track 1 and Track 2 are understood by reference to U.S. patent application Ser. No. 07/433,961 entitled DUAL CHANNEL HELICAL SCAN RECORDER, which is incorporated herein by reference.

FIG. 8 shows the format of each the data blocks 317 provided in both Track 1 and Track 2. The format for the data blocks 317 is the same, regardless of whether the data block 317 is written on Track 1 or Track 2. As shown in FIG. 8, each data block 317 (also known as a "physical data block") includes a physical block header 350 (of 14 bytes); a data area 352 (of 1024 bytes); an error correction code ("ECC") area 354 (of 400 bytes); and, a cyclical redundancy check ("CRC") area 356 (of 2 bytes).

FIG. 9 depicts the format of the physical block header 350 of each physical data block 317. FIG. 9 shows a hexidecimal numbering scheme for the physical block header 350. The header 350 is used to determine the type of information contained in the block 317, e.g., the block type, and how the information is stored. As indicated above, the header 350 consists of 14 bytes. The four lower order bits of byte 0 of the header 350 contain a value (identifier BLOCK TYPE) which indicates the typing of the block 317. The following hexadecimal values are associated with different block types: "0H" represents user data; "AH" represents a filemark; "CH" represents a logical beginning of tape (LBOT) write with retry; "DH" represents a LBOT write with no retry; "EH" represents a gap; and, "FH" represents end of data.

As indicated above, a BLOCK TYPE value of "0H" signifies that a physical block 317 contains user data. Such a block 317 is referred to as a User Data Block. A User Data Block is a physical block which can contain up to 1024 bytes of user data in the data area 352.

Of interest to the present invention is the fact that the physical block header 350 includes an AUXECC field and an INIECC field. In this regard, the AUXECC field (byte 0, bit 7) indicates that the information contained in the data area of 8 consecutive blocks contains auxilliary ECC data for the preceding 128 block of data. The INIECC field (byte 0, bit 6) indicates that the 8 consecutive blocks are the first 8 block of a set of 128 blocks for which 8 auxillary ECC data has been written to the tape. The WRTRTY field (byte 0, bit 5) indicates if this block has been previously written.

STRUCTURE: AUXECC CIRCUIT

Figure 10:
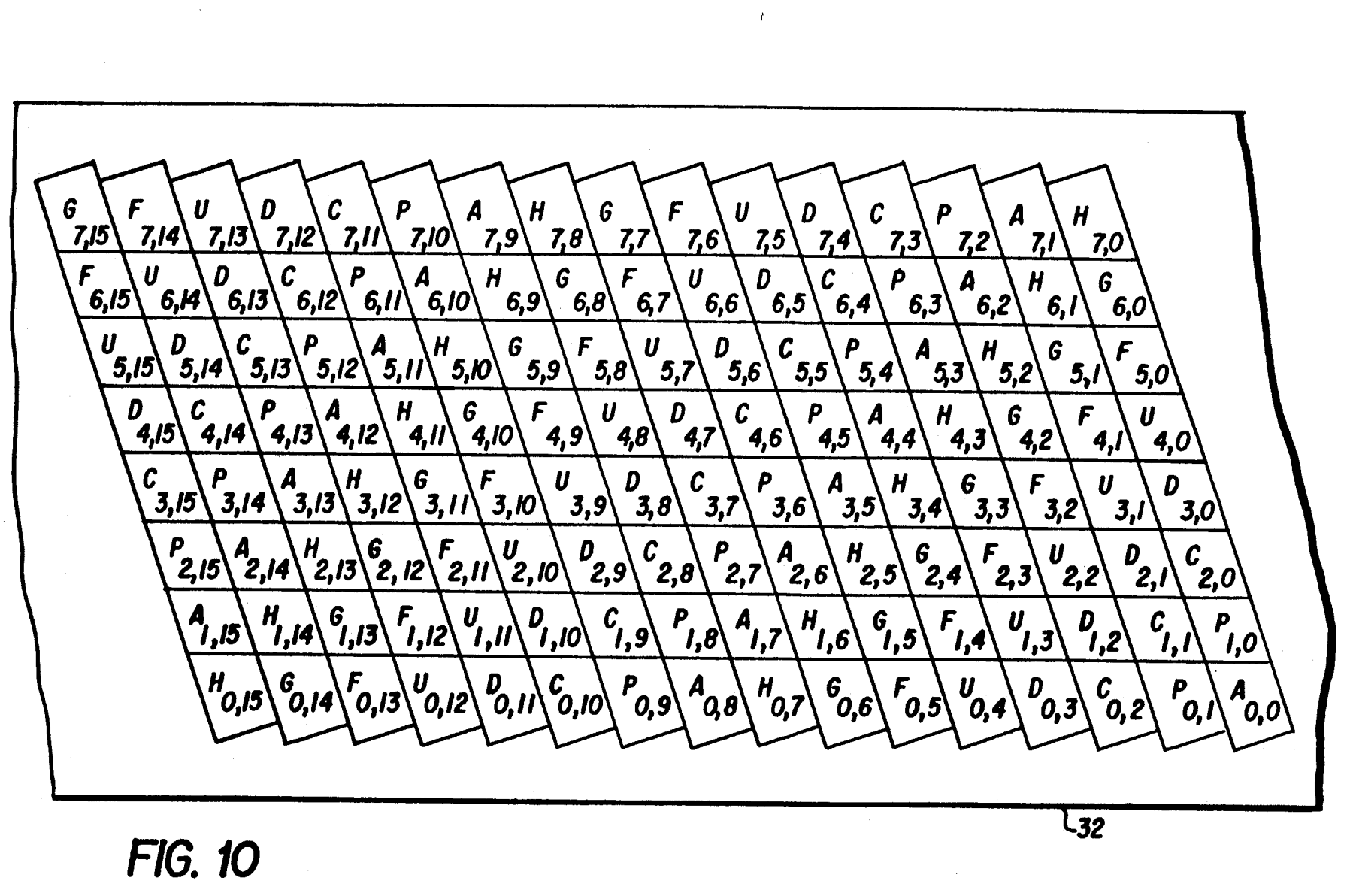

The AUXECC circuit 111 includes an AUXECC RAM 702 which is used to store data for generating an AUXECC stripe on the magnetic tape 32. FIG. 10 shows a segment of tape 32, and a group G of sixteen helical stripes 704 recorded thereon, particularly stripes $704_0$-$704_{15}$.

Concerning the constituency of stripe group G, stripes $704_0$-$704_{14}$ inclusive are stripes wherein the physical data blocks 317 (described above) contain user informational data and error correction information. Stripe $704_{15}$ is an AUXECC stripe, generated in the manner described below, which offers an additional layer or dimension of error correction capability. In this regard, the AUXECC stripe $704_{15}$ is used for error correction purposes when a conventional error correction circuit provided in the decoder/de-formatter 110 is unable to decode one or more blocks.

FIG. 11 shows a segment of tape 32 including a plurality of stripe groups G, namely group $G_n$ and group $G_{n+1}$. The last stripe, i.e. stripe $704_{15}$ of each group G is an AUXECC stripe and is shown somewhat darker than the other stripes in the group for illustration purposes. Thus, it is seen that a multitude of successive groups G are provided on the tape 32.

Returning now to the structure of the AUXECC circuit 111 as described in FIG. 3, the AUXECC RAM 702 is sized to accommodate eight blocks. In addition to the AUXECC RAM 702, the AUXECC circuit 111 includes an address generator 710; a controller 712; an address multiplexer (MUX) 714; an XOR circuit represented by XOR gate 716; and, a data transmission MUX 718.

A stream of eight bit data enters the AUXECC circuit 111 on a line designated DATA-IN in FIG. 3. As described below in connection with the operation of the AUXECC circuit 111, in a write mode the data on line DATA-IN is received from the buffer manager 106 (see FIG. 4). In a read mode the data on line DATA-IN is the stream of data received from the RLL De-Modulator 142.

The eight bit data on line DATA-IN is connected both to input terminal 0 of MUX 718 and to the XOR circuits 716. Although not expressly shown as such, it should be understood that the XOR gate 716 represents eight such XOR gates, one gate for each bit of information carried on line DATA-IN. Likewise, MUX 718 represents a bank of eight multiplexers, one for each bit of information carried on line DATA-IN.

Output terminals of the XOR circuit 716 are connected to the eight data input pins of the AUXECC RAM 702. The eight output pins of the AUXECC RAM 702 are connected to input terminal 1 of the MUX 718. In addition, the eight output pins of the AUXECC RAM 702 are connected to input terminals of eight respective AND gates represented by AND gate 726, the output terminals of which are connected to respective XOR gates in the XOR circuit 716.

The address generator 710 generates an address for application via the address MUX 714 to the AUXECC RAM 702. The address generator 710 includes a byte-counter 730; an OR gate 731; a block counter 732; a stripe counter 734; and, an adder 736.

The AUXECC circuit 111 is informed via line BYTE CLOCK when a new byte is being applied on line DATA-IN. In this respect, circuitry is elsewhere provided for pulsing a line BYTE CLOCK for each transmission of bits passed over the line DATA-IN.

The BYTE CLOCK signal is applied to a count enable pin of the byte counter 730. The data output pins of the byte counter 730 are connected to terminal 0 of the address MUX 714. As is understood, the address MUX 714 actually represents a plurality of multiplexers corresponding to the number of bits in the address.

A carry output of the byte counter 730 is connected through OR gate 731 to the count enable pin of the block counter 732. The block counter 732 has its three data output pins connected to a first port of the adder 736.

A carry output pin of the block counter 732 is connected to an enable count pin of the stripe counter 734. The stripe counter 734 has its three lower order data output pins connected to both a second port of the adder 736 and to the logic controller 712.

The three lower order output pins of the adder are connected by a line 437 to the three higher order input pins of terminal 0 of the address MUX 714.

FIG. 3 also shows an intra-block error correction circuit 740, which is more properly included in the decoder/de-formatter 110 but illustrated in FIG. 3 for convenience. The error correction circuit (ECC) 740 is connected to apply a signal to the select pin of MUX 714 and to the logic controller 712. The ECC circuit 740 is also connected to apply a BLOCK COUNT INCREMENT pulse on line 741 to OR gate 731 whenever the ECC circuit 740 is unable to decode a block of data. The ECC circuit 740 is also connected to the MUX 714 to apply the address of an error block to terminal 1 of the MUX 714. Moreover, the ECC circuit 740 is connected to receive a BAD BLOCK ADDRESS value on line 743.

The select pin of the data transmission MUX 718 is connected by line 742 to an output of the logic controller 712. The logic controller 712 informs the MUX 718 to accept data at one of the terminals 0 or 1 thereof. The logic controller 712 also has an output terminal connected by line 724 to a second terminal of the AND gate circuit 726.

OPERATION: AUXECC ENCODING

As mentioned previously, in helical scan technology there are two types of error that can result from two types of motions. The first type of error destroys multiple blocks in a stripe. A second type of error destroys blocks in the same position in consecutive stripes (i.e., blocks aligned in the direction of tape travel).

In order to overcome the problem of lost blocks, and of lost stripes and rows of blocks, as described above with reference to FIGS. 10 and 11, the AUXECC block generator 111 of the present invention generates a stripe $704_{15}$ of AUXECC blocks for every group G stripes. The AUXECC stripe $704_{15}$ is physically the last stripe in a group.

AUXECC blocks $E_i$ included in the AUXECC stripe $704_{15}$ are obtained by performing an exclusive or ("XOR") operation with other blocks in a sub-group i of the group G. Each AUXECC block $E_i$ is a member of a sub-group i, with the other members of the subgroup i being specially chosen, in the manner described below, to permit recovery of entire stripes and rows.

By stating that an exclusive or (XOR) operation is performed with other blocks of a sub-group, what is meant is that each bit of a block in the subgroup is XORed with a corresponding bit in other blocks in the sub-group.

FIG. 10 shows each stripe 704 divided into eight blocks. Each block is generically represented as $B_{r,c}$. Each block belongs to a row "r" (running parallel to the direction of tape travel as indicated by arrow 46) and a column, or stripe, "c". For example, block $B_{2,0}$ as illustrated in FIG. 10 is the block in row 2, stripe 0, actually shown as block $C_{2,0}$ having the same subscripts r,c as the generic block designator $B_{2,0}$.

A sub-group formulation and arrangement for the helical scan system 30 of the illustrated embodiment is shown in FIG. 10. In lieu of the generic block designation, each block is shown as having one of the alphabetical letters A, P, C, D, U, F, G, or H indicative of the sub-group to which it belongs (letters P and U being used to avoid confusion with generic identifiers). The alphabetical sub-group letters are subcripted to indicate the row and stripe number where the block is physically located in the group G.

According to the organization of FIG. 10, the subgroup i=A is composed of the blocks $A_{0,0}$; $A_{7,1}$; $A_{6,2}$; $A_{5,3}$; $A_{4,4}$; $A_{3,5}$; $A_{2,6}$; $A_{1,7}$; $A_{0,8}$; $A_{7,9}$; $A_{6,10}$; $A_{5,11}$; $A_{4,12}$; $A_{3,13}$; $A_{2,14}$; and, $A_{1,15}$. As another example, sub-group i=U is composed of the blocks $U_{4,0}$; $U_{3,1}$; $U_{2,2}$; $U_{1,3}$; $U_{0,4}$; $U_{7,5}$; $U_{6,6}$; $U_{5,7}$; $U_{4,8}$; $U_{3,9}$; $U_{2,10}$; $U_{1,11}$; $U_{0,12}$; $U_{7,13}$; $U_{6,14}$; and, $U_{5,15}$.

Thus, the sub-group formulation and arrangement for the helical scan system 30 of the illustrated embodiment is obtained by a shifting selection of blocks $B_{r,c}$. The shifting selection is particularly implemented by the address generator 710 included in the AUXECC circuit 111, as will be described further below. The shifting selection of blocks for inclusion in a sub-group enables recovery of entire rows and columns.

A generic description of the sub-group formulation relationship is now provided. Assume that each group G consists of "n" number of stripes or columns and "k" number of rows. Assume further that "m" number of AUXECC blocks E are to be generated for the group G, where $m = q \times k$ (i.e, q multiplied by k) with q being an integer. Each of the bits $b_x$ in error block $E_i$ corresponding to user data in the user data blocks is logically XORed with corresponding bits of the user data blocks also included in the sub-group i. For the formulation relationship described above, the values of each bit position $b_x$ included in each block $E_i$ is derived from the logically XORing of the bits having bit position $b_x$ in all blocks $B_{r,c}$ where $$i = (r + k(c \bmod q) + INT(c/q)) \bmod m \qquad \text{[Eqn. 1]}$$

in which INT(c/q) is the largest integer not greater than c/q). Thus, solving the foregoing equation Eqn. 1 for i for any given block $B_{r,c}$ yields the sub-group classification i for that block.

The foregoing generic equation Eqn. 1 is implemented by the AUXECC circuit 111 of the illustrated embodiment using k (the number of rows per stripe)=8; n (the number of stripes per group g)=16; and m (the number of AUXECC blocks)=8. The address generator 710 particularly implements the foregoing equation Eqn. 1 and the block shifting scheme illustrated in FIG. 10.

During a record operation, data to be encoded and recorded on tape is supplied to the AUXECC circuit 111 on line DATA-IN from the data buffer manager 106. As each byte is applied on the line DATA-IN, the BYTE CLOCK signal is pulsed, so that the byte counter 730 counts the number of bytes. The byte counter 730 counts up to the maximum number of bytes in a block (1048). The count of counter 730 is applied as the lower 10 bits of an address to terminal 0 of the address MUX 714.

When the byte counter 730 exceeds it maximun count capacity, as will occur when all the bytes of a block are counted, the carry signal of the byte counter 730 is used to increment the block counter 732. The count of the block counter 732 is applied to the adder 736. When the block counter 732 reaches its maximum count of eight (the number of blocks in a stripe), the block counter carry signal is applied to the stripe counter 734.

Using the carry signal from the block counter 732, the stripe counter 734 counts the number of stripes of data passing through the AUXECC circuit 111 for the group G. The contents of the stripe counter 734 is applied both to the adder 736 and to the logic controller 712.

The adder 736 functions to add the two numbers represented by the values in the block counter 732 and the stripe counter 734, and to perform a "modulo 8" operation with respect to those two values. By taking the lower three bits of the sum, the modulo 8 operation is performed. The lower three bits of the sum obtained by adder 736 is applied as the higher order bits of an address to terminal 0 of the address multiplexer 714.

For the first 15 stripes of in-coming data for each group G (on line DATA-IN), the logic controller 712 causes the data transmission MUX 718 to pass the user data on to the encoder/formatter 108 where, among other things, block header information is added. For these first 15 stripes, each in-coming byte is also XORed with corresponding other bytes (i.e., bytes having the same byte position) for other blocks in the same sub-group i.

The control logic 712, having access to the contents of the stripe counter 734, enables the MUX 718 to transmit the user data of the first 15 stripes of a group G to the encoder/formatter 108, by applying a signal representative of MUX 718 terminal 0 on the line 742.

As mentioned above, each in-coming byte of user data is XORed with corresponding other bytes. The XOR operation is accomplished using the XOR circuit 716. The bits of the in-coming byte of user data are summed with corresponding bits in the same sub-group i, with the sum being stored in the AUXECC RAM 702. The summation is accomplished using the XOR circuit 716, which has the contents of the appropriate byte summation in the AUXECC RAM 702 as one input and the in-coming data byte as a second input. It is understood by those skilled in the art that a one-bit sum of digital bits having either "1" or "0" value is the same as a logical XOR operation performed with respect to those bits.

The address generator 710 determines with which byte in AUXECC RAM 702 the in-coming data byte is to be summed for implementing the sub-block selection arrangement of the invention. The address generator 710 does this by performing the modulo 8 operation at the adder 736 with respect to the counts in the block counter 732 and in the stripe counter 734. The address generator 710 essentially selects, in accordance with the foregoing equation Eqn. 1, the byte address in the AUXECC stripe with which the in-coming data is to be summed. The operation of the address generator 710 results in the sub-group classification shown in FIG. 10.

After 15 stripes of in-coming data have been received, the logic controller 712 sends a signal on line 742 to direct the data transmission MUX 718 to transmit the contents of the AUXECC RAM 702 to the encoder/formatter 108. At this point, the contents of the AUXECC RAM 702 is the AUXECC stripe $704_{15}$.

After the contents of the AUXECC RAM 702 is transmitted, the encoder/formatter 108 prepares a header 350 and an error correction area 354 (see FIG. 8) for each AUXECC block included in the AUXECC stripe $704_{15}$, as is done for each of the user data blocks also processed by the encoder/formatter 118.

For preparing the header 317 of an AUXECC block, the logic controller sends a signal to a record header generator in the encoder/formatter 118 to enable the encoder/formatter 118 to set a AUXECC bit in the header 350. As shown in FIG. 9, the AUXECC bit occurs at byte 0, bit 7 of the AUXECC record header 350.

The error correction information generated by the encoder/formatter 108 for the ECC field 354 for each block, including the AUXECC blocks, is dependent upon the particular intra-block error correction polynomials with which the helical scan system is operating. Although example intra-block ECC techniques have been cited above, it should be understood that the choice of of intra-block ECC techniques does not affect the inter-block error correction of the present invention.

Whenever encoding of a new group G of stripes is begun, for the first stripe of the group (i.e., stripe "0") the logic controller 712 informs the block header generator in the encoder/formatter 108 that the blocks of that stripe are in the first stripe following an AUXECC stripe. In this respect, the logic controller 712 generates a signal on line 744 which is used by the header generator to set the INIECC bit in the block header 350. The INIECC bit (byte 0, bit 6) is shown in FIG. 9.

In addition, the signal on line 744 from the logic controller 712 is used to by the AND gate 726 to reset the contents of the AUXECC RAM 702 for the first stripe in a group G. When the signal on line 744 turns off the AND gate 726 for the first stripe, the data on line DATA-IN goes directly into the AUXECC RAM 702.

For systems that have the capability of rewritting bad blocks to tape, it is apparent that the AUXECC block-generation elements described above must be suppressed while the bad block to-be-re-written is transmitted on the DATA-IN line.

The foregoing discussion of the write mode presumes that the address MUX 714 transmits the address generated by the address generator 710 to the AUXECC RAM 702. Only in the read mode, described below, would the case be otherwise, and then only when the intra-block ECC circuit 740 is unable to decode a block.

OPERATION: DECODING

During a read or decoding mode, the in-coming data is ultimately obtained from the read circuits, rather than from the data buffer manager 106. All in-coming data during the read mode is first applied to the intra-block ECC circuit 740, which decodes each block using a conventional error correction code, or product codes, for example. The in-coming data is then applied on line DATA-IN for application to the AUXECC circuit 111.

As the in-coming data enters the AUXECC circuit 111 on line DATA-IN, for each sub-group i the bits $b_x$ are summed in the AUXECC RAM 702. The summation and addressing operation is essentially the as was conducted during the write operation, except for the fact that corresponding bits for bytes in all 16 stripes of a group G are summed, including the AUXECC stripe $704_{15}$. Assuming no read errors occured, at the end of the 16th stripe of a group, i.e., after the reading of the AUXECC stripe 704₁₅ of the group, the contents of the AUXECC RAM 702 should be all zero to reflect error-free reading.

When the intra-block ECC circuit 740 is unable to decode an error block, the address of the bad block is determined by the ECC circuit 740. In this regard, the address of the bad block has a modulo 8 operation performed thereon by the ECC circuit 740 as was done by the address generator 710, thereby making the bad block address usable in connection with the sub-block arrangement of the invention. This bad block address is applied to terminal 1 of the address MUX 714. Simultaneously, the ECC circuit 740 pulses line 741 to increment the block counter 732 to compensate, in the computation of addresses, for the omission of the bad block from DATA-IN.

After attempting to decode the entire group G, the ECC circuit 740 sends and ERROR DETECT signal to the address MUX 714. In addition, the ECC circuit 740 sends a bad block address, prepared as described above, to the address MUX 714.

The ERROR DETECT signal applied to the select pin of the address MUX 714 preempts normal operation of the AUXECC circuit 111. In connection with this preemption, the address of the bad block is applied via the MUX 714 to the AUXECC RAM 702. Using the bad block address, the MUX selects the block in the AUXECC RAM 702 corresponding to the sub-group i to which the bad block belongs. At this point in time, the contents of the selected block in AUXECC RAM 702 is the sum of the remaining blocks in subgroup i to which the bad block belongs, excepting the bad block. That sum is the bad block, meaning that the contents of the AUXECC RAM 702 for the selected block address is the corrected bad block.

Although the preceding discussion has illustrated the correction of just one block in a group G, it should be understood that the AUXECC circuit 111 of the present invention can be used to reconstruct a plurality of blocks. In this regard, for any group G for which the intra-block ECC circuit 740 is unable to decode, after attempted decoding of each block in the group the afore-described steps are conducted with respect to each block found uncorrectable by ECC circuit 740. That is, the ECC circuit supplies the bad block address to the address MUX 714 for each such bad block while the operation of the input data stream is temporarily preempted.

Thus, a plurality of entire blocks can be recreated by the present invention. To this end, strategic classification of blocks into related sub-groups and the XORing of corresponding bits for blocks in the sub-group permit the reconstruction of an entire stripe of recorded blocks or m contiguous blocks in a row.

Although one particular example of the sub-group classification of the present invention has been illustrated above, it should be understood that other applications for the classification are applicable in other embodiments. For example, FIG. 13 illustrates an example wherein m=18; n=20; and k=6. In FIG. 13, the AUXECC blocks are provided in stripes 17, 18 and 19.

While the invention has been particularly shown and described with reference to the preferred embodiments thereof, it will be understood by those skilled in the art that various alterations in form and detail may be made therein without departing from the spirit and scope of the invention.

I claim:

1. A method of encoding informational data for transmission to a storage medium, said method comprising:
    formatting informational data into at least some of a group of blocks $B_{r,c}$, with each block $B_{r,c}$ belonging to a row r and a column c, with r ranging from 0 to k-1 and with c ranging from 0 to n-1, and with each block $B_{r,c}$ including bit positions $b_x$ wherein x ranges from an integer Y to an integer Z;
    generating m number of error correction blocks $E_i$ to be included in said group of blocks $B_{r,c}$, wherein i ranges from 0 to m-1, wherein $m = q \times k$ with q being an integer constant, each of said error correction blocks $E_i$ also including bit positions $b_x$ wherein x ranges from integer Y to integer Z, and wherein a value for each bit position $b_x$ included in each block $E_i$ is derived from a sum of bits having bit position $b_x$ in all blocks $B_{r,c}$ where $$i = (r + k(c \bmod q) + INT(c/q)) \bmod m$$

in which INT(c/q) is the largest integer not greater than c/q).

2. The method of claim 1, wherein a value for each bit position $b_x$ included in each block $E_i$ is derived from performing an exclusive OR operation using values of the bits having bit position $b_x$.

3. The method of claim 1, wherein said storage medium is magnetic tape, further comprising recording said blocks $B_{r,c}$ on said storage medium, and wherein all blocks $B_{r,c}$ in the same column are recorded together in a helical stripe on the magnetic tape.

4. The method of claim 3, wherein k=8, q=1, and m=8.

5. The method of claim 4, wherein n=16.

6. The method of claim 1, wherein said m number of error correction blocks $E_i$ are the last of the blocks in said group of blocks $B_{r,c}$ recorded on said storage medium.

7. The method of claim 6, wherein said storage medium is magnetic tape, further comprising recording said blocks $B_{r,c}$ on said storage medium, and wherein said step of recording comprises recording all blocks $B_{r,c}$ having the same column in a helical stripe and subsequently recording said error correction blocks $E_i$ in m/q number of helical stripes.

8. The method of claim 7, further comprising providing in said error correction blocks $E_i$ an indication that said block is an error correction block.

9. The method of claim 1, further comprising using a codeword to operate upon bit positions $b_x$ (where x ranges from integer Y to integer Z) to obtain error correction bits for inclusion at additional bit positions in said block $B_{r,c}$.

10. The apparatus of claim 1, further comprising means for recording said blocks $B_{r,c}$ on said storage medium, wherein said storage medium is magnetic tape, and wherein all blocks $B_{r,c}$ in the same column are recorded together in a helical stripe on the magnetic tape.

11. The apparatus of claim 10, wherein k=8, q=1, and m=8.

12. The apparatus of claim 11, wherein n=16.

13. A method of encoding informational data for transmission to a storage medium, said method comprising:
    formatting informational data into at least some of a group of blocks $B_{r,c}$, with each block $B_{r,c}$ belonging to a row r and a column c, with r ranging from 0 to k-1 and with c ranging from 0 to n-1, and with each block $B_{r,c}$ including bit positions $b_x$ wherein x ranges from an integer Y to an integer Z;

organizing said blocks $B_{r,c}$ into subgroups;

generating m number of error correction blocks $E_i$ to be included in said group of blocks $B_{r,c}$, with each block $E_i$ being included in one of said subgroups and each subgroup including one of said error correction blocks $E_i$, wherein i ranges from 0 to m-1, wherein $m = q \times k$ with q being an integer constant, each of said error correction blocks $E_i$ also including bit positions $b_x$ wherein x ranges from integer Y to integer Z, and wherein a value for each bit position $b_x$ included in each block $E_i$ is derived by performing an exclusive OR operation upon values of the bits having bit position bx for all blocks $B_{r,c}$ included in the same subgroup;

recording said blocks $B_{r,c}$ on said storage medium, wherein all blocks $B_{r,c}$ having a same column are recorded in a same helical stripe; and, subsequently recording said error correction blocks $E_i$ in m/q number of helical stripes.

14. The method of claim 13, wherein a value for each bit position $b_x$ included in each block $E_i$ is derived from a sum of bits having bit position $b_x$ for all blocks $B_{r,c}$ where $$i = (r + k(c \bmod q) + INT(c/q)) \bmod m$$

in which INT(c/q) is the largest integer not greater than c/q).

15. The method of claim 13, wherein said subgroups are organized so that no blocks in a same column are in a same subgroup.

16. The method of claim 13 wherein said subgroups are organized so that no sequence of m contiguous blocks in the same row are in the same subgroup.

17. The method of claim 13, wherein said storage medium is magnetic tape, further comprising recording said blocks $B_{r,c}$ on said storage medium, and wherein all blocks $B_{r,c}$ in a same column are recorded together in a helical stripe on the magnetic tape.

18. The method of claim 17, wherein k=8, q=1, and m=8.

19. The method of claim 18, wherein n=16.

20. The method of claim 13, further comprising providing in said error correction blocks $E_i$ an indication that said block is an error correction block.

21. The method of claim 13, further comprising using a codeword to operate upon bit positions $b_x$ (where x ranges from integer Y to integer Z) to obtain error correction bits for inclusion at additional bit positions in said block $B_{r,c}$.

22. A method of encoding informational data for transmission to a magnetic tape, said method comprising:

(a) formatting information data into at least some of a group of blocks $B_{r,c}$, with each block $B_{r,c}$ belonging to a row r and a column c, with r ranging from 0 to k-1 and with c ranging from 0 to n-1, and with each block $B_{r,c}$ including bit positions $b_x$ wherein x ranges from an integer Y to an integer Z;

(b) generating m number of error correction blocks $E_i$ to be included in said group of blocks $B_{r,c}$, wherein i ranges from 0 to m-1, wherein $m = q \times k$ with q being an integer constant, each of said error correction blocks $E_i$ also including bit positions $b_x$ wherein x ranges from integer Y to integer Z, and wherein a value for each bit position $b_x$ included in each block $E_i$ is derived from a sum of the bits having bit position $b_x$ in all blocks $B_{r,c}$ where $$i = (r + k(c \bmod q) + INT(c/q)) \bmod m$$

in which INT/(c/q) is the largest integer not greater than c/q); and, (c) recording all blocks $B_{r,c}$ in r number of helical stripes on the magnetic tape, with all blocks $B_{r,c}$ in a same column c being recorded in a same helical stripe on the magnetic tape, and with the error correction blocks $E_i$ being recorded at the last m/q number of stripes of the r number of stripes.

23. The method of claim 22, further comprising:

including in said error correction blocks $E_i$ an indication that said blocks are error correction blocks; and, including in blocks $B_{r,c}$ which are written as a first stripe of said group of blocks $B_{r,c}$ that said blocks are not error correction blocks $E_i$.

24. The method of claim 23, further comprising repeating steps (a) through (c) for a plurality of groups of blocks $B_{r,c}$.

25. Apparatus for encoding informational data for transmission to a storage medium, said apparatus comprising:

means for formatting informational data into at least some of a group of blocks $B_{r,c}$, with each block $B_{r,c}$ belonging to a row r and a column c, with r ranging from 0 to k-1 and with c ranging from 0 to n-1, and with each block $B_{r,c}$ including bit positions $b_x$ wherein x ranges from an integer Y to an integer Z;

means for generating m number of error correction blocks $E_i$ to be included in said group of blocks $B_{r,c}$, wherein i ranges from 0 to m-1, wherein $m = q \times k$ with q being an integer constant, each of said error correction blocks $E_i$ also including bit positions $b_x$ wherein x ranges from integer Y to integer Z, and wherein a value for each bit position $b_x$ included in each block $E_i$ is derived from a sum of the bits having bit position $b_x$ in all blocks $B_{r,c}$ where $$i = (r + k(c \bmod q) + INT(c/q)) \bmod m$$

in which INT(c/q) is the largest integer not greater than c/q).

26. The apparatus of claim 25, wherein a value for each bit position $b_x$ included in each block $E_i$ is derived from performing an exclusive OR operation using values of the bits having bit position $b_x$.

27. The apparatus of claim 25, further comprising means for recording said blocks $B_{r,c}$ on said storage medium, wherein said m number of error correction blocks $E_i$ are the last of the blocks in said group of blocks $B_{r,c}$ recorded on said storage medium.

28. The apparatus of claim 25, further comprising means for providing in said error correction blocks $E_i$ an indication that said block is an error correction block.

29. The apparatus of claim 25, further comprising means for using a codeword to operate upon bit positions $b_x$ (where x ranges from integer Y to integer Z) to obtain error correction bits for inclusion at additional bit positions in said block $B_{r,c}$.

30. Apparatus of encoding informational data for transmission to a storage medium, said apparatus comprising:

means for formatting informational data into at least some of a group of blocks $B_{r,c}$, with each block $B_{r,c}$ belonging to a row r and a column c, with r ranging from 0 to k-1 and with c ranging from 0 to n-1, and with each block $B_{r,c}$ including bit positions $b_x$ wherein x ranges from an integer Y to an integer Z;

means for organizing said blocks $B_{r,c}$ into subgroups;

means for generating m number of error correction blocks $E_i$ to be included in said group of blocks $B_{r,c}$, with each block $E_i$ being included in one of said subgroups and each subgroup including one of said error correction blocks $E_i$, wherein i ranges from 0 to m-1, wherein $m = q \times k$ with q being an integer constant, each of said error correction blocks $E_i$ also including bit positions $b_x$ wherein x ranges from integer Y to integer Z, and wherein a value for each bit position $b_x$ included in each block $E_i$ is derived by performing an exclusive OR operation upon values of the bits having bit position bx for all blocks $B_{r,c}$ included in the same subgroup;

means for recording said blocks $B_{r,c}$ on said storage medium, wherein all blocks $B_{r,c}$ having a same column are recorded in a same helical stripe; and for subsequently recording said error correction blocks $E_i$ in m/q number of helical stripes.

31. The apparatus of claim 30, wherein a value for each bit position $b_x$ included in each block $E_i$ is derived from a sum of bits having bit position bx for all blocks $B_{r,c}$ where $$i = (r + k(c \bmod q) + INT(c/q)) \bmod m$$

in which INT(c/q) is the largest integer not greater than c/q).

32. The apparatus of claim 30, wherein said subgroups are organized so that no blocks in a same column are in a same subgroup.

33. The apparatus of claim 30, wherein said subgroups are organized so that no sequence of m contiguous blocks in a same row are in a same subgroup.

34. The apparatus of claim 30, further comprising means for recording said blocks $B_{r,c}$ on said storage medium; wherein said storage medium is magnetic tape, and wherein all blocks $B_{r,c}$ in the same column are recorded together in a helical stripe on the magnetic tape.

35. The apparatus of claim 34, wherein k=8, q=1, and m=8.

36. The apparatus of claim 35, wherein n=16.

37. The apparatus of claim 30, further comprising means for providing in said error correction blocks $E_i$ an indication that said block is an error correction block.

38. The apparatus of claim 30, further comprising means for using a codeword to operate upon bit positions $b_x$ (where x ranges from integer Y to integer Z) to obtain error correction bits for inclusion at additional bit positions in said block $B_{r,c}$.

39. Apparatus for encoding informational data for transmission to a magnetic tape, said apparatus comprising:

means for formatting informational data into at least some of a group of blocks $B_{r,c}$, with each block $B_{r,c}$ belonging to a row r and a column c, with r ranging from 0 to k-1 and with c ranging from 0 to n-1, and with each block $B_{r,c}$ including bit positions $b_x$ wherein x ranges from an integer Y to an integer Z;

means for generating m number of error correction blocks $E_i$ to be included in said group of blocks $B_{r,c}$, wherein i ranges from 0 to m-1, wherein $m = q \times k$ with q being an integer constant, each of said error correction blocks $E_i$ also including bit positions $b_x$ wherein x ranges from integer Y to integer Z, and wherein a value for each bit position $b_x$ included in each block $E_i$ is derived from a sum of the bits having bit position $b_x$ in all blocks $B_{r,c}$ where $$i = (r + k(c \bmod q) + INT(c/q)) \bmod m$$

in which INT(c/q) is the largest integer not greater than c/q); and, means for recording all blocks $B_{r,c}$ in k number of helical stripes on the magnetic tape, with all blocks $B_{r,c}$ in a same column c being recorded in a same helical stripe on the magnetic tape, and with error correction blocks $E_i$ being recorded as the last m/q number of stripes of the n number of stripes.

40. The apparatus of claim 39, further comprising:

means for including in said error correction blocks $E_i$ an indication that said blocks are error correction blocks; and, means for including in blocks $B_{r,c}$ which are written as a first stripe of said group of blocks $B_{r,c}$ that said blocks are not error correction blocks $E_i$.

41. A method of decoding informational data obtained from a storage medium, said method comprising:

obtaining from said storage medium a plurality of blocks $B_{r,c}$ belonging to a group G, wherein each block $B_{r,c}$ belongs to a row r and a column c, with r ranging from 0 to k-1 and with c ranging from 0 to n-1, and with each block $B_{r,c}$ including bit positions $b_x$ wherein x ranges from an integer Y to an integer Z;

summing, for blocks $B_{r,c}$ correctly readable from said storage medium, and for each of a plurality m-1 of subgroups i, the bit positions $b_x$ of the blocks $B_{r,c}$ belonging to each subgroup i, thereby obtaining a summation for each of the bit positions $b_x$, wherein i ranges from 0 to m-1, wherein $m = q \times k$ with q being an integer constant, and wherein $$i = (r + k(c \bmod q) + INT(c/q)) \bmod m$$

in which INT(c/q) is the largest integer not greater than c/q); and, using said summation for a subgroup i to derive the bit positions $b_x$ of a block $B_{r,c}$ included in said subgroup i but not readable from said storage medium.

42. The method of claim 41, wherein said summation is obtained by performing an exclusive OR operation using values of the bits having bit position $b_x$.

43. The method of claim 42, wherein an address of a block $B_{r,c}$ not readable from said storage medium is used to determine to what subgroup i said block belongs.

44. The method of claim 41, wherein k=8, q=1, and m=8.

45. The method of claim 44, wherein n=16.

46. Apparatus for decoding informational data obtained from a storage medium, said apparatus comprising:

means for obtaining from said storage medium a plurality of blocks $B_{r,c}$ belonging to group G, wherein each block $B_{r,c}$ belongs to a row r and a column c, with r ranging from 0 to k-1 and with c ranging from 0 to n-1, and with each block $B_{r,c}$ including bit positions $b_x$ wherein x ranges from an integer Y to an integer Z;

means for summing, for blocks $B_{r,c}$ correctly readable from said storage medium, and for each of a plurality m-1 of subgroups i, the bit positions $b_x$ of the blocks $B_{r,c}$ belonging to each subgroup i, thereby obtaining a summation for each of the bit positions $b_x$, wherein i ranges from 0 to m-1, wherein $m = q \times k$ with q being an integer constant, and wherein $$i = (r - k(c \bmod q) - INT(c/q)) \bmod m$$

in which INT(c/q) is the largest integer not greater than c/q; and, means for using said summation for a subgroup i to derive the bit positions $b_x$ of a block $B_{r,c}$ included in said subgroup i but not readable from said storage medium.

47. The apparatus of claim 46, wherein means for summing comprises an exclusive OR logic gate.

48. The method of claim 46, wherein an address of a block $B_{r,c}$ not readable from said storage medium is used to determine to what subgroup i said block belongs.

49. The method of claim 46, wherein k = 8, q = 1, and m = 8.

50. The method of claim 49, wherein n = 16.

* * * * *